No. 752,851. PATENTED FEB. 23, 1904.
R. McMORLAND.
SAW SETTING AND SHARPENING MACHINE.
APPLICATION FILED JULY 28, 1902.
NO MODEL. 3 SHEETS—SHEET 2.
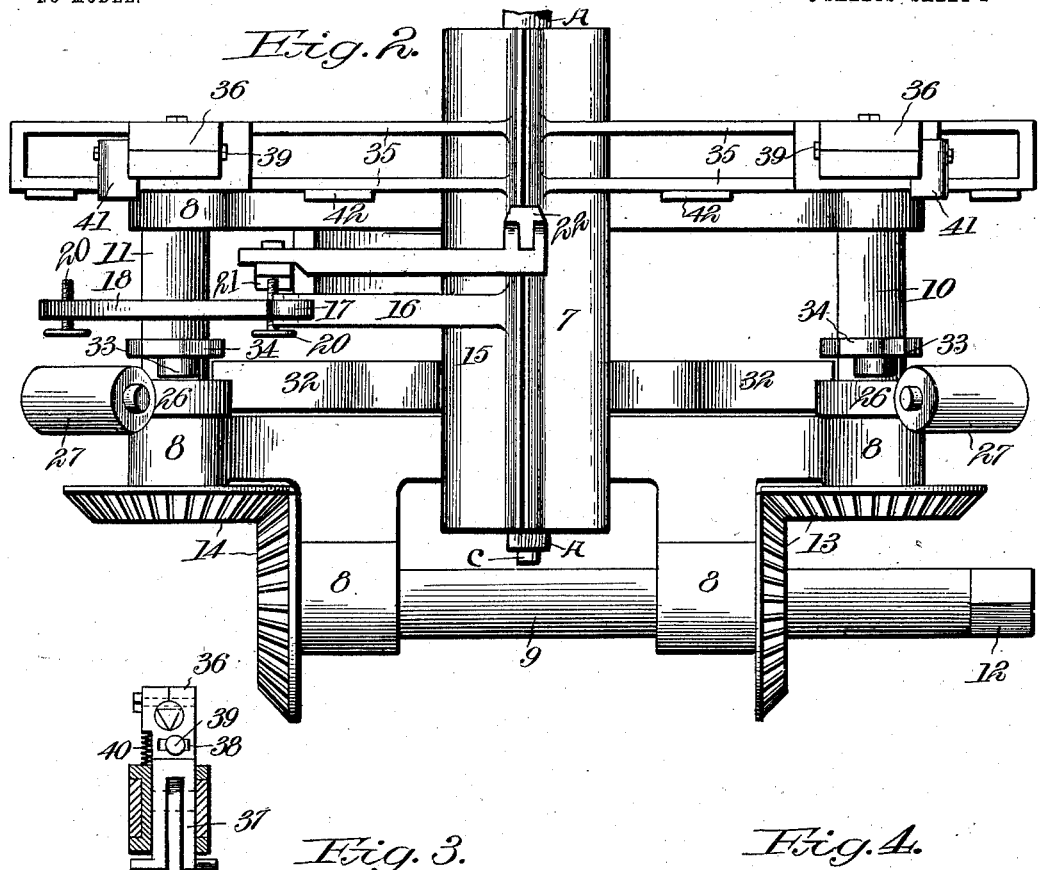
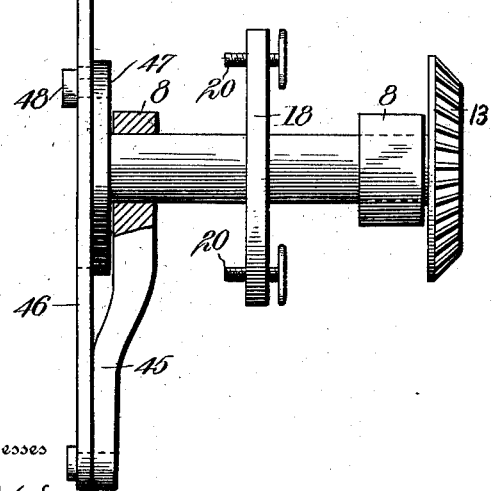
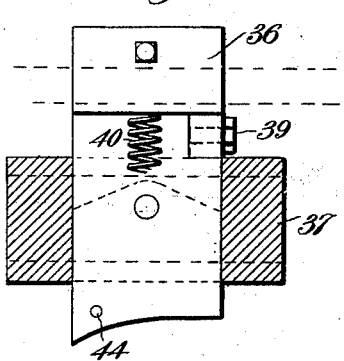
Witnesses
C. H. Walker.
R. M. Green.
Inventor
Robert McMorland,
By Frank S. Appleman
Attorney No. 752,851. PATENTED FEB. 23, 1904.
R. McMORLAND.
SAW SETTING AND SHARPENING MACHINE.
APPLICATION FILED JULY 28, 1902.
NO MODEL. 3 SHEETS—SHEET 3.
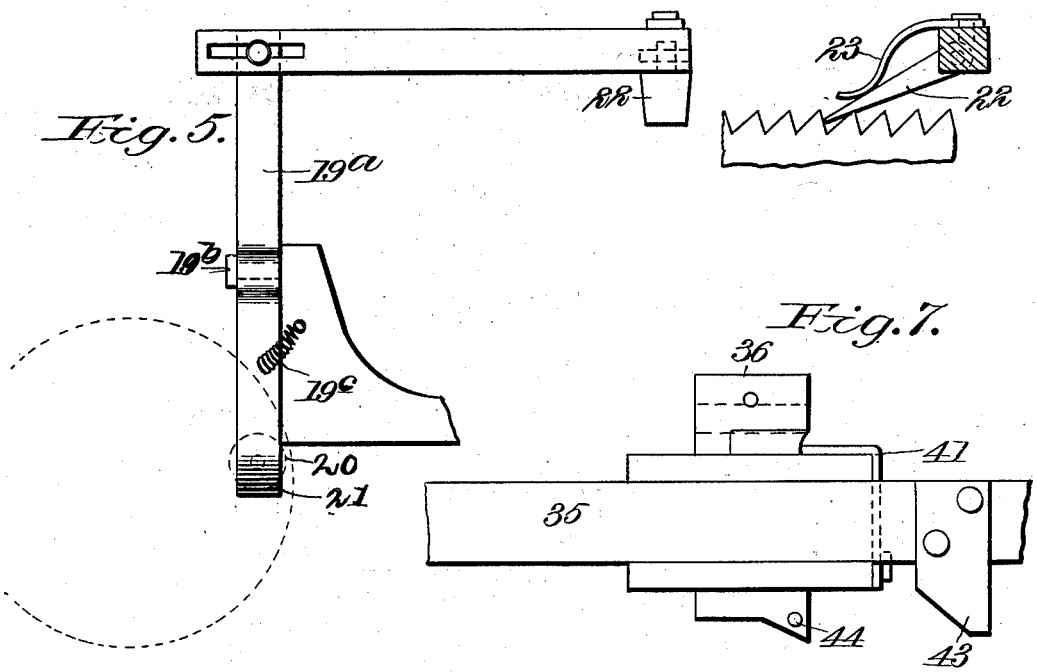
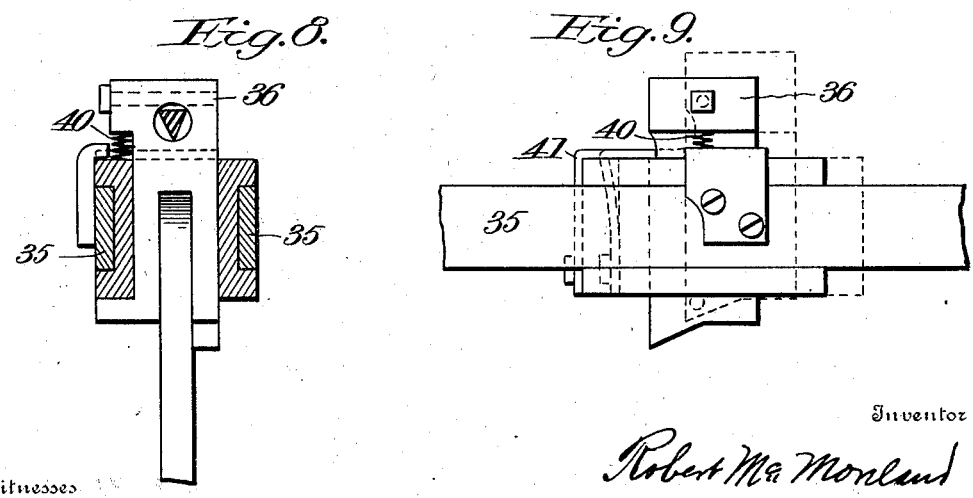
Witnesses
H. M. Royse
Henry O. Bright
Inventor
Robert McMorland
Frank S. Appleman
Attorney No. 752,851. Patented February 23, 1904.

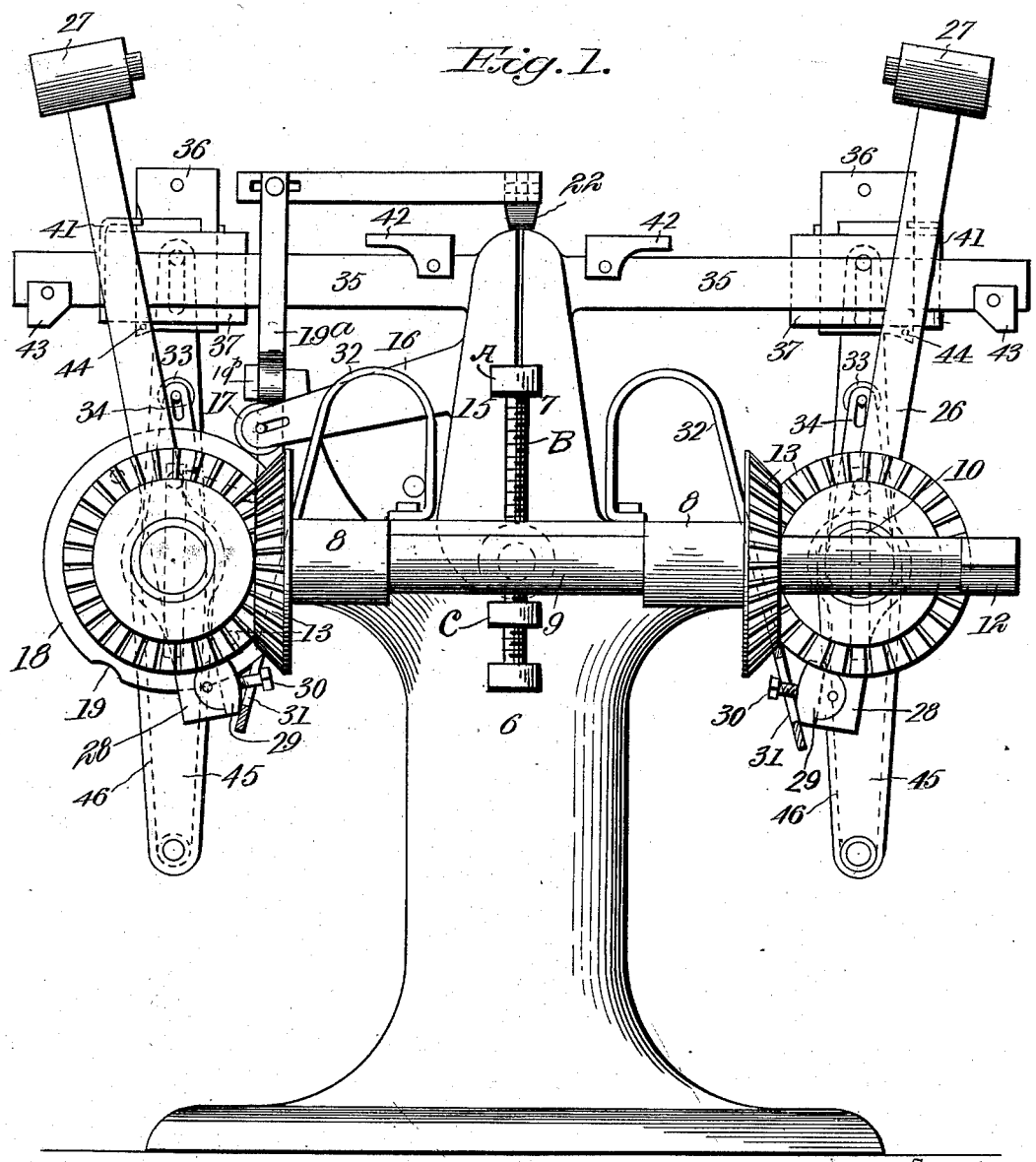

UNITED STATES PATENT OFFICE.

ROBERT McMORLAND, OF PHILADELPHIA, PENNSYLVANIA.

SAW SETTING AND SHARPENING MACHINE.

SPECIFICATION forming part of Letters Patent No. 752,851, dated February 23, 1904.

Application filed July 28, 1902. Serial No. 117,389. (No model.)

*To all whom it may concern:*

Be it known that I, ROBERT MCMORLAND, a subject of the King of Great Britain, residing at Philadelphia, in the county of Philadelphia and State of Pennsylvania, have invented certain new and useful Improvements in Saw Setting and Sharpening Machines, of which the following is a specification.

My invention relates to improvements in mechanism for sharpening and setting the teeth of saws, which may be utilized in connection with hand-power or other driving means.

The object of the invention is to provide a combination of parts, whereby at a single operation the teeth may be automatically struck blows of uniform force.

Furthermore, the object of the invention is to provide a tooth-filing device driven by the same source of power as the setting mechanism, the said filing mechanism comprising means for causing the engagement and disengagement of the file and saw with the reciprocation of the files.

Furthermore, the object of the invention is to provide an automatically-operated clamp for the saw with means for releasing the saw automatically and for movement or feeding the saw longitudinally of the clamp.

A further object of the invention is to produce a saw setting and filing machine which, considering the results attained, is simple in construction, efficient and satisfactory in use, and comparatively inexpensive to produce and sustain.

With the foregoing and other objects in view the invention consists in the details of construction and in the arrangement and combination of parts, to be hereinafter more fully set forth and claimed.

In describing the invention in detail reference will be had to the accompanying drawings, forming part of the specification, wherein like characters denote corresponding parts in the several views, and in which—

Figure 1 is an end view indicating a machine embodying the invention. Fig. 2 is a plan view thereof. Fig. 3 is a detail view of the file-carrier and a part of its operating mechanism; Fig. 4, a detail view of the file clamp and carrier. Fig. 5 is a detail view of the saw-moving device. Fig. 6 is a detail view of the spring-pressed saw-engaging dog. Figs. 7, 8, and 9 are detail views of the file clamp and carrier.

The saw is supported on the blocks A, supported on screws B, and the screws B are threaded in extensions C of the frame.

In the drawings, 6 denotes the base, having formed therewith a jaw 7 and suitable bearings 8 for the shafts 9, 10, and 11, the shaft 9 being the power-shaft, which may be provided at the end 12 with a crank-handle or other power-transmitting means, which, not forming a part of the invention, need not be described in detail. Gearing 13 and 14 afford means for communicating motion from the power-shaft to the shafts 10 and 11. A jaw 15 is pivoted to the base 6 to act in conjunction with the jaw 7, the said pivoted jaw 15 having an arm 16, which carries on its outer end an antifriction-roller 17, made adjustable in order that the distance between the jaws may be varied to accommodate saws of varying width. A disk 18 is carried by the shaft 11, and its periphery is engaged by the antifriction-roller 17. The peripheral surface of the disk is recessed at 19 for the purpose of permitting the antifriction-roller to run therein, causing the jaw 15 to swing on its pivot and release the saw, at which instant the arm $19^a$, which is pivoted on the arm $19^b$, is oscillated by means of the trip-screw 20 engaging the cam-surface 21 of the enlarged end of the arm. A dog 22 is pivoted at the inner end of the arm and has a spring 23 for causing the point of the dog to engage the teeth of the saw to carry the saw longitudinally of the jaws. By reason of the adjustable nature of the trip-screw 20 the throw of the arm may be varied to govern the distance of the movement of the saw in the clamp, thus making the mechanism suitable for saws with a varying number of teeth to the inch. The arm $19^a$ is returned to its normal position by the spring $19^c$.

The hammers for giving set to the teeth comprise the arms 26, which are mounted on the shafts 10 and 11, said arms carrying extensions 28, depending below the shafts. The lower ends of the extensions have blocks 29 pivoted thereto, and said blocks have threaded bolts 30, which ride in slots 31 of the springs 32, the said springs being engaged by antifriction-rollers 33, which are carried by the arms 34, which rotate with the shafts 10 and 11, the said antifriction-rollers pressing the lower ends of the springs 32, which when released spring back sufficiently and with uniform power, and said springs being connected to the extensions 28 of the arms 26 cause said arms to swing to such an extent as to bring the hammers into contact with the teeth of a saw secured between the jaws. It will be observed that the arms are mounted on the shafts, but are free to have motion independent of the shafts.

The saw-filing mechanism comprises a suitable track or way 35 on each side of the jaws in which the file-clamps 36 have carriers 37. The clamps 36 have slots 38, and set-screws 39 run through the slots to bind the saw-clamps to the carriers. The clamps are vertically movable and are held elevated by means of the springs 40 when the file is out of engagement with the saw; but the clamps are held depressed by springs 41, which engage notches in said clamps when the files are to operate. On movement of the carriers and clamps toward the jaws the clamps are held depressed by the springs 41 until the said springs contact with the trips 42, when the said springs release the clamps, and owing to the springs 40 the clamps are elevated to remove the files from engagement with the teeth when the carriers move outwardly. At the end of the outward movement the cam edges of the trips 43 engage pins 44 in the carriers and cause the depression of the clamps, which being engaged again by the springs 41 are held depressed.

Arms 45 have pitmen 46 pivoted at their lower ends, and the wheels 47, with pins 48 operating in slots of the pitmen, serve to oscillate the pitmen, and as said pitmen have their upper ends pivoted to the carrier the said carriers are moved.

From the foregoing it will be observed that the setting and filing mechanism is operated in conjunction from a common source and that provision is made for automatic horizontal and vertical movement of the saw-clamps and for the uniform stroke of the hammer, which is a distinct advantage in this class of machinery.

Having fully described the invention, what I claim as new, and desire to secure by Letters Patent, is—

1. In a saw setting and sharpening machine, a suitable saw-holder, means for operating the saw-holder, means for moving the saw longitudinally, carriers movable transversely of the saw, file-clamps carried thereon, said file-clamps having notches in their rear edges, spring-detents for engaging the clamps and holding them depressed, means for tripping the springs and releasing the clamps, means for elevating the clamps, and means for depressing the clamps as and for the purpose described.

2. In a saw setting and sharpening machine, a saw-clamp for releasing and clamping the saw, an oscillating arm and means for moving the arm, means on the arm for engaging the teeth of the saw to move it longitudinally, carriers movable transversely of the saw, file-clamps carried thereby, springs for holding the clamps depressed, trips for causing the disengagement of the springs with the clamps, pins on the clamps and cam-arms for engaging the pins and depressing the clamps.

In testimony whereof I affix my signature, in the presence of two witnesses, this 26th day of July, 1902.

ROBERT McMORLAND.

Witnesses:
JAMES S. PHILLIPS,
MARGARET A. HUST.